(12) United States Patent
Zhang et al.

(10) Patent No.: US 11,341,845 B2
(45) Date of Patent: May 24, 2022

(54) METHODS AND SYSTEMS FOR ROADWORK ZONE IDENTIFICATION

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 216 days.

(21) Appl. No.: 16/217,922

(22) Filed: Dec. 12, 2018

(65) Prior Publication Data
US 2020/0193809 A1    Jun. 18, 2020

(51) Int. Cl.
| | |
|---|---|
| *G08G 1/01* | (2006.01) |
| *G08G 1/0967* | (2006.01) |
| *G08G 1/0962* | (2006.01) |
| *G06V 20/58* | (2022.01) |

(52) U.S. Cl.
CPC ......... *G08G 1/0133* (2013.01); *G06V 20/582* (2022.01); *G08G 1/0112* (2013.01); *G08G 1/0145* (2013.01); *G08G 1/09623* (2013.01); *G08G 1/096725* (2013.01)

(58) Field of Classification Search
CPC .. G08G 1/0133; G08G 1/0145; G08G 1/0112; G08G 1/096725; G08G 1/09623; G06K 9/00818
See application file for complete search history.

(56) References Cited

U.S. PATENT DOCUMENTS

| | | |
|---|---|---|
| 8,996,269 B2 | 3/2015 | Ham |
| 9,195,914 B2 | 11/2015 | Fairfield et al. |
| 9,489,586 B2 | 11/2016 | Chung |

(Continued)

FOREIGN PATENT DOCUMENTS

| | | |
|---|---|---|
| DE | 102016202973 B4 | 8/2017 |
| KR | 20150049529 A | 5/2015 |
| KR | 20170033716 A | 3/2017 |

OTHER PUBLICATIONS

Riffkin et al., "Variable Speed Limit Signs Effects on Speed and Speed Variation in Work Zones", Report No. UT-08.01, Jan. 2008, 48 pages.

*Primary Examiner* — Aniss Chad
*Assistant Examiner* — Chase L Cooley
(74) *Attorney, Agent, or Firm* — Ditthavong, Steiner & Mlotkowski

(57) ABSTRACT

A method, a system, and a computer program product may be provided for generating at least one route speed funnel for roadwork zone identification. The method may include generating a plurality of learned speed signs from a first plurality of road sign observations captured by a first plurality of vehicles, determining a plurality of candidate speed funnels from the plurality of learned speed signs, based on corresponding locations, corresponding headings, and corresponding sign values and generating at least one route speed funnel from the plurality of candidate speed funnels based on session identifiers associated with a second plurality of vehicles of the first plurality of vehicles and corresponding time stamps of the plurality of learned speed signs. Each of the plurality of candidate speed funnels comprises a different pair of learned speed signs selected from the plurality of learned speed signs.

20 Claims, 7 Drawing Sheets

(56) References Cited

U.S. PATENT DOCUMENTS

| | | | |
|---|---|---|---|
| 2018/0025628 A1* | 1/2018 | Ivanov | G08G 1/052 |
| | | | 701/117 |
| 2018/0134286 A1 | 5/2018 | Yi et al. | |
| 2020/0042807 A1* | 2/2020 | Schutzmeier | G08G 1/0141 |

* cited by examiner

| SESSION IDENTIFIERS OF ROAD SIGN OBSERVATIONS IN TARGET LEARNED SPEED SIGN 50 | SESSION IDENTIFIERS OF ROAD SIGN OBSERVATIONS IN VALUE FILTERED LEARNED SPEED SIGN 40 |
|---|---|
| 1 | 4 |
| 9 | 2 |
| 3 | 7 |
| 4 | 10 |
| 2 | |
| 7 | |
| 5 | |

FIG. 7

METHODS AND SYSTEMS FOR ROADWORK ZONE IDENTIFICATION

TECHNOLOGICAL FIELD

The present disclosure generally relates to identification of roadwork zones in a geographical region, and more particularly relates to generating at least one route speed funnel for roadwork zone identification.

BACKGROUND

Road works or roadwork zones are typically found on a section of a road or an entire road that is occupied for the purpose of, for example, road surface repairs, work on power lines, water works, etc. Roadwork zones may also be found when a major accident occurs and road debris from the accident needs to be cleared. Such roadwork zones are indicated to users of vehicles or autonomous vehicles using road signs, such as, "men at work" sign, "roadwork ahead" sign etc., or temporary signs such as traffic cones, barrier boards, etc. In some countries, the roadwork zones are indicated to the users of vehicles or autonomous vehicles using lane markings from a distance of the roadwork zone and speed limit signs from a distance of the roadwork zone. A user of the vehicle may identify the roadwork zones using such road signs at low speeds but it might not be possible to identify those signs at higher speeds. Moreover, for autonomous vehicles, identifying such signs well in advance is of utmost importance to avoid collisions and undue mishaps.

BRIEF SUMMARY

Detection of roadwork zones is essential for navigation of autonomous vehicles and providing environmental awareness for vehicle safety has been a primary concern for automobile manufacturers and related service providers. In vehicles, such as, autonomous vehicles, a plurality of sensors are installed to capture the road signs indicating the roadwork zones. However, with current sensors installed in the autonomous vehicles, the autonomous vehicles may not be capable to detect road signs such as a "men at work" sign. In order to identify roadwork zones, the autonomous vehicles may detect speed limit signs that are in close vicinity or along a driving path of the roadwork zone. The vehicles are capable of reporting individual speed limit observations on detecting speed limit signs. Typically, sign values of the speed limit signs indicate a decrease towards the roadwork zone replicating a funnel. Therefore, the speed limit signs with the reducing sign values are referred to as a speed funnel. However, a speed funnel may not necessarily identify a roadwork zone. Many a times, a speed funnel may indicate an upcoming tunnel or a high curvature road, or a transition from a highway to ramps and the vehicles may be misled in their identification of the roadwork zones. It would be advantageous to detect a speed funnel on a route towards a destination of the user for identifying roadwork zones en route the destination. Accordingly, there is a need for identifying a roadwork zone for autonomous vehicles and semi-autonomous vehicles to make a smooth transition from an autonomous mode to a manual mode when approaching a roadwork zone.

A method, a system, and a computer program product are provided in accordance with an example embodiment described herein for generating at least one route speed funnel for roadwork zone identification. Embodiments disclosed herein may provide a method for generating at least one route speed funnel for roadwork zone identification. The method includes: generating, by a processor, a plurality of learned speed signs from a first plurality of road sign observations captured by a first plurality of vehicles, wherein the first plurality of road sign observations comprise session identifiers associated with the first plurality of vehicles, and wherein the plurality of learned speed signs is associated with corresponding locations, corresponding headings, and corresponding sign values. The method further includes determining a plurality of candidate speed funnels from the plurality of learned speed signs, based on the corresponding locations, the corresponding headings, and the corresponding sign values and generating at least one route speed funnel from the plurality of candidate speed funnels based on the session identifiers associated with a second plurality of vehicles of the first plurality of vehicles and corresponding time stamps of the second plurality of road sign observations associated with the plurality of learned speed signs. Each of the plurality of candidate speed funnels comprises a different pair of learned speed signs selected from the plurality of learned speed signs. The first plurality of road sign observations further comprise location data, heading data, road sign types, road sign values, and time stamps associated with capture of the first plurality of road sign observations. Determining the plurality of candidate speed funnels includes: calculating a plurality of distances between the corresponding locations of learned speed signs of each pair of learned speed signs in the generated plurality of learned speed signs, filtering the generated plurality of learned speed signs based on the calculated plurality of distances lying within a threshold distance range, to obtain a plurality of distance filtered learned speed signs, determining a plurality of heading filtered learned speed signs from the plurality of distance filtered learned speed signs based on a heading difference between each pair of the plurality of distance filtered learned speed signs lying within a threshold heading range, filtering the plurality of heading filtered learned speed signs based on a difference in the corresponding sign values of each pair of the plurality of heading filtered learned speed signs lying within a threshold value range, to obtain a plurality of pairs of value filtered learned speed signs, and determining the plurality of candidate speed funnels based on the plurality of pairs of value filtered learned speed signs.

At least one route speed funnel comprises a different pair of learned speed signs generated from the second plurality of road sign observations of the first plurality of road sign observations. The second plurality of road sign observations are captured by the second plurality of vehicles. A sign value of a learned speed sign in a first position in the route speed funnel is greater than a sign value of a learned speed sign in a second position in the route speed funnel. The method further comprises determining presence of a roadwork zone in vicinity of a corresponding location of the learned speed sign in the second position in the route speed funnel. In some example embodiments, the generated at least one route speed funnel comprises two or more route speed funnels and, in an embodiment at least two route speed funnels of the two or more route speed funnels have a common learned speed sign. The method further comprises merging at least two route speed funnels of the two or more route speed funnels based on a position of the common learned speed sign in each of at least two route speed funnels of the two or more route speed funnels.

In an example embodiment, a system for generating at least one route speed funnel for roadwork zone identification is provided. The system may include at least one non-transitory memory configured to store computer program code instructions, and at least one processor configured to execute the computer program code instructions to at least: generate a plurality of learned speed signs from a first plurality of road sign observations captured by a first plurality of vehicles, determine a plurality of candidate speed funnels from the plurality of learned speed signs, based on corresponding locations, corresponding headings, and corresponding sign values, and generate at least one route speed funnel from the determined plurality of candidate speed funnels based on session identifiers associated with a second plurality of vehicles of the first plurality of vehicles and corresponding time stamps of second plurality of road sign observations associated with the plurality of learned speed signs. The processor may be further configured to calculate a plurality of distances between the corresponding locations of learned speed signs of each pair of learned speed signs in the generated plurality of learned speed signs, filter the generated plurality of learned speed signs based on the calculated plurality of distances lying within a threshold distance range, to obtain a plurality of distance filtered learned speed signs, determine a plurality of heading filtered learned speed signs from the plurality of distance filtered learned speed signs based on a heading difference between each pair of the plurality of distance filtered learned speed signs lying within a threshold heading range, filter the plurality of heading filtered learned speed signs based on a difference in the corresponding sign values of each pair of the plurality of heading filtered learned speed signs lying within a threshold value range, to obtain a plurality of pairs of value filtered learned speed signs, and determine the plurality of candidate speed funnels based on the plurality of pairs of value filtered learned speed signs. In some example embodiments, the generated at least one route speed funnel comprises two or more route speed funnels, and in an embodiment, at least two route speed funnels of the two or more route speed funnels have a common learned speed sign. The processor may be optionally configured to merge at least two route speed funnels of the two or more route speed funnels based on a position of the common learned speed sign in each of at least two route speed funnels of the two or more route speed funnels.

Embodiments of the present invention may provide a computer program product including at least one non-transitory computer-readable storage medium having computer-executable program code instructions stored therein. The computer-executable program code instructions when executed by a computer, cause the computer to carry out operations for generating at least one route speed funnel for roadwork zone identification, the operations including: generating, by a processor, a plurality of learned speed signs from a first plurality of road sign observations captured by a first plurality of vehicles, determining a plurality of candidate speed funnels from the plurality of learned speed signs, based on corresponding locations, corresponding headings, and corresponding sign values and generating at least one route speed funnel from the determined plurality of candidate speed funnels based on session identifiers associated with a second plurality of vehicles of the first plurality of vehicles and corresponding time stamps of the second plurality of road sign observations associated with the plurality of learned speed signs. According to some embodiments, the operations further include: calculating a plurality of distances between the corresponding locations of learned speed signs of each pair of learned speed signs in the generated plurality of learned speed signs, filtering the generated plurality of learned speed signs based on the calculated plurality of distances lying within a threshold distance range, to obtain a plurality of distance filtered learned speed signs, determining a plurality of heading filtered learned speed signs from the plurality of distance filtered learned speed signs based on a heading difference between each pair of the plurality of distance filtered learned speed signs lying within a threshold heading range, filtering the plurality of heading filtered learned speed signs based on a difference in the corresponding sign values of each pair of the plurality of heading filtered learned speed signs lying within a threshold value range, to obtain a plurality of pairs of value filtered learned speed signs, and determining the plurality of candidate speed funnels based on the plurality of pairs of value filtered learned speed signs. At least one route speed funnel may include a different pair of learned speed signs generated from a second plurality of road sign observations of the first plurality of road sign observations, and the second plurality of road sign observations are captured by the second plurality of vehicles. A sign value of a learned speed sign in a first position in at least one route speed funnel is greater than a sign value of a learned speed sign in a second position in at least one route speed funnel, and the, and the road sign observations corresponding to the learned speed sign in the first position have corresponding time stamps earlier than corresponding time stamps of the road sign observations corresponding to the learned speed sign in the second position in at least one route speed funnel.

In some example embodiments, the operations further include determining a roadwork zone in vicinity of a corresponding location of the learned speed sign in the second position in at least one route speed funnel, and merging at least two route speed funnels of the two or more route speed funnels based on a position of the common learned speed sign in each of at least two route speed funnels of the two or more route speed funnels, wherein the generated at least one route speed funnel comprises two or more route speed funnels, and wherein at least two route speed funnels of the two or more route speed funnels have a common learned speed sign.

BRIEF DESCRIPTION OF THE DRAWINGS

Figure 1:
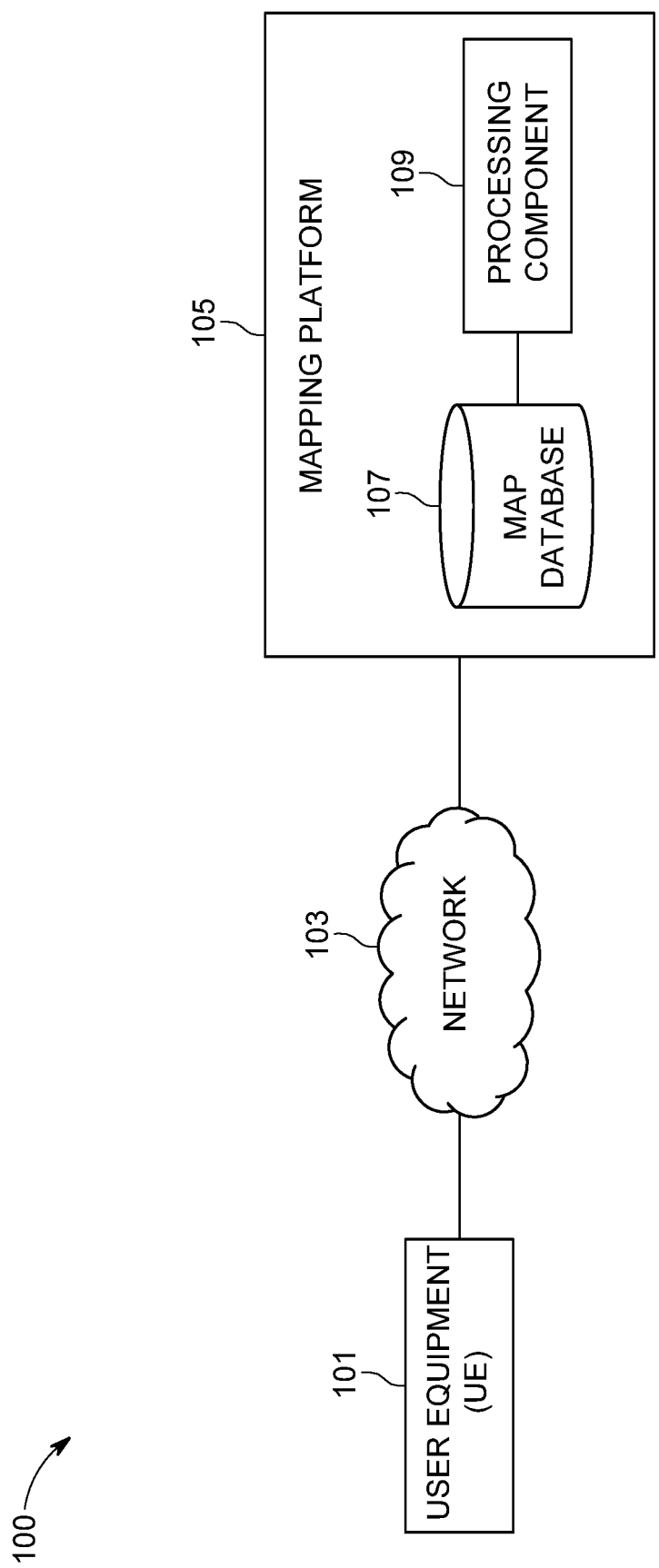
Figure 2:
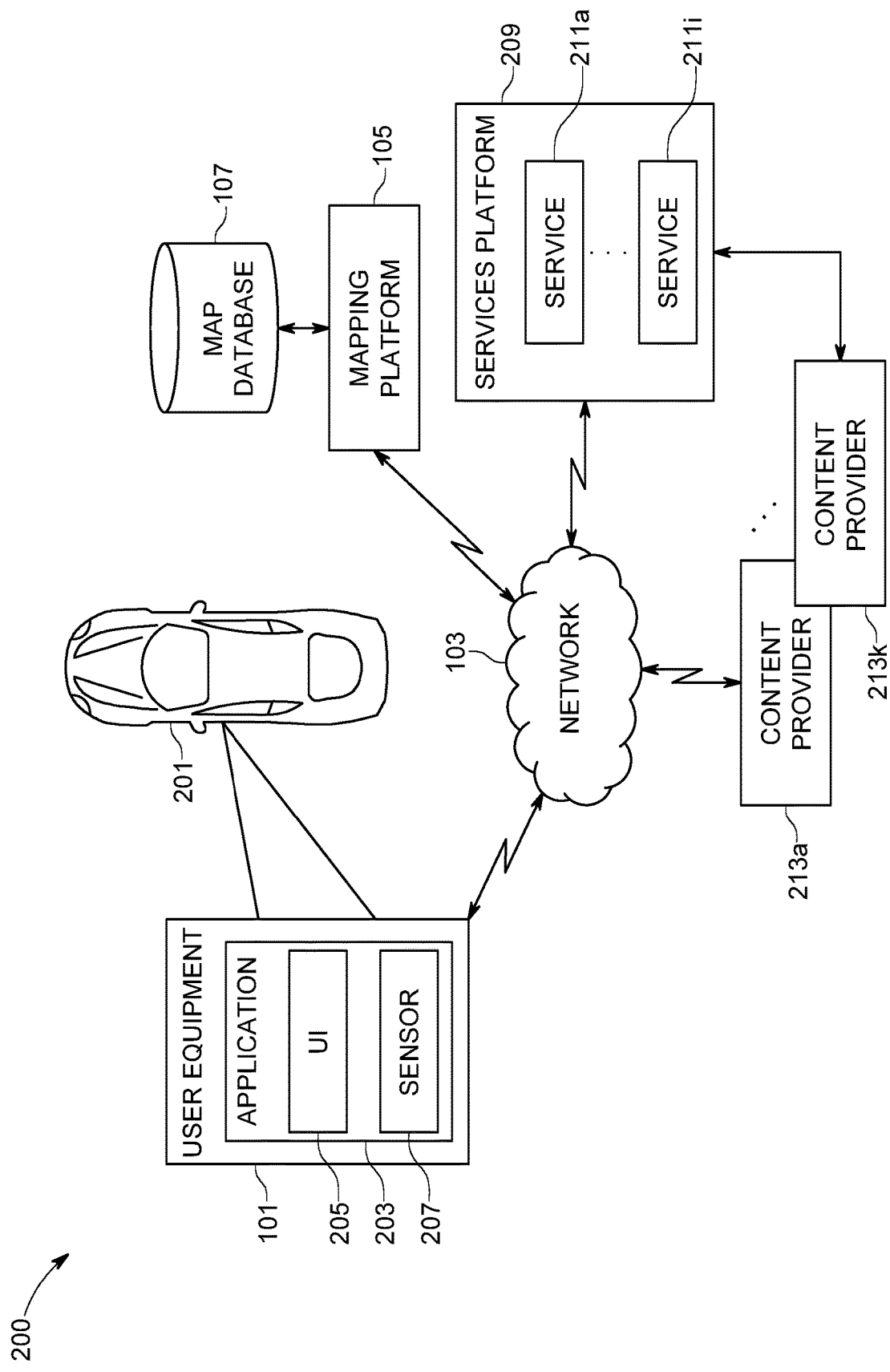
Figure 3:
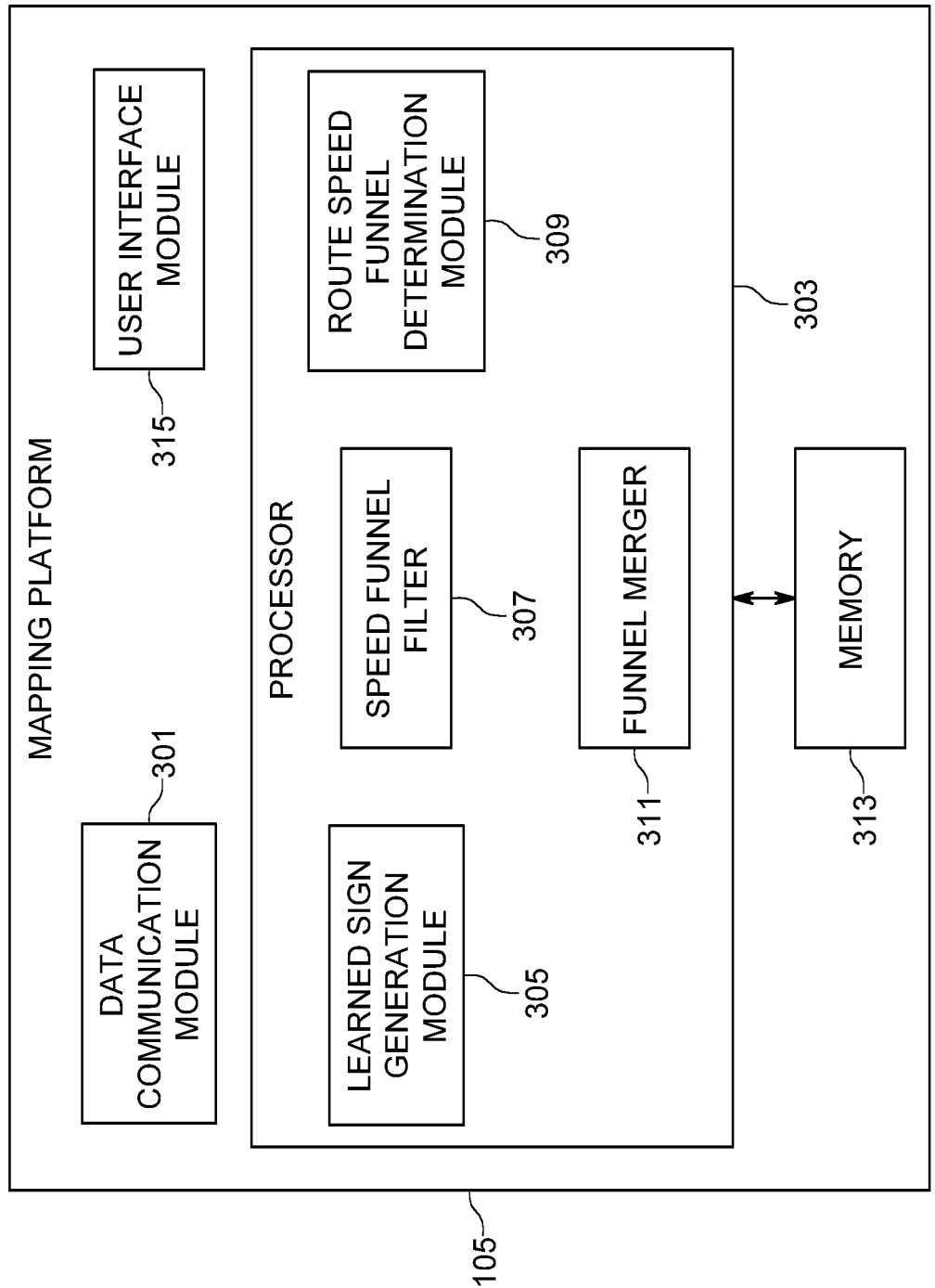
Figure 4:
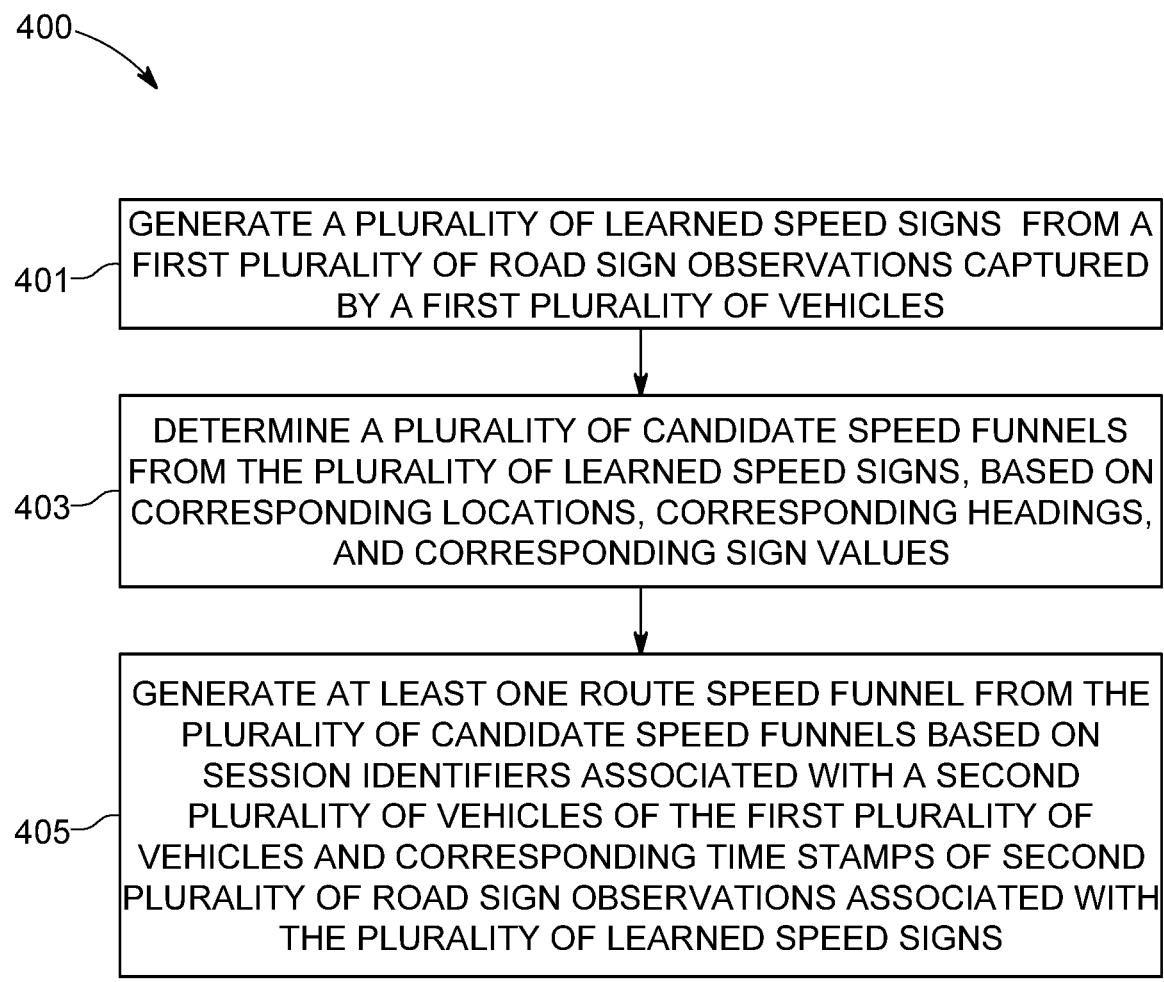
Figure 5:
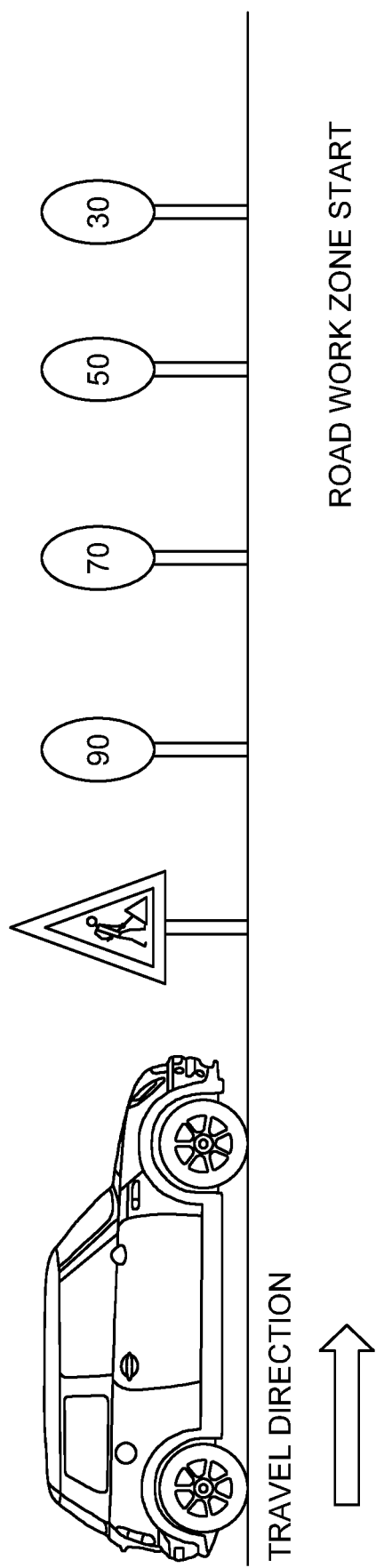
Figure 6:
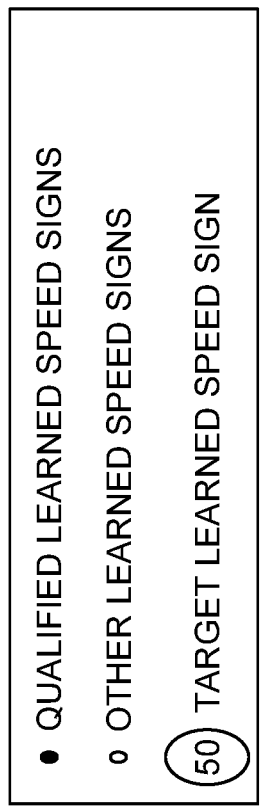
Figure 6:
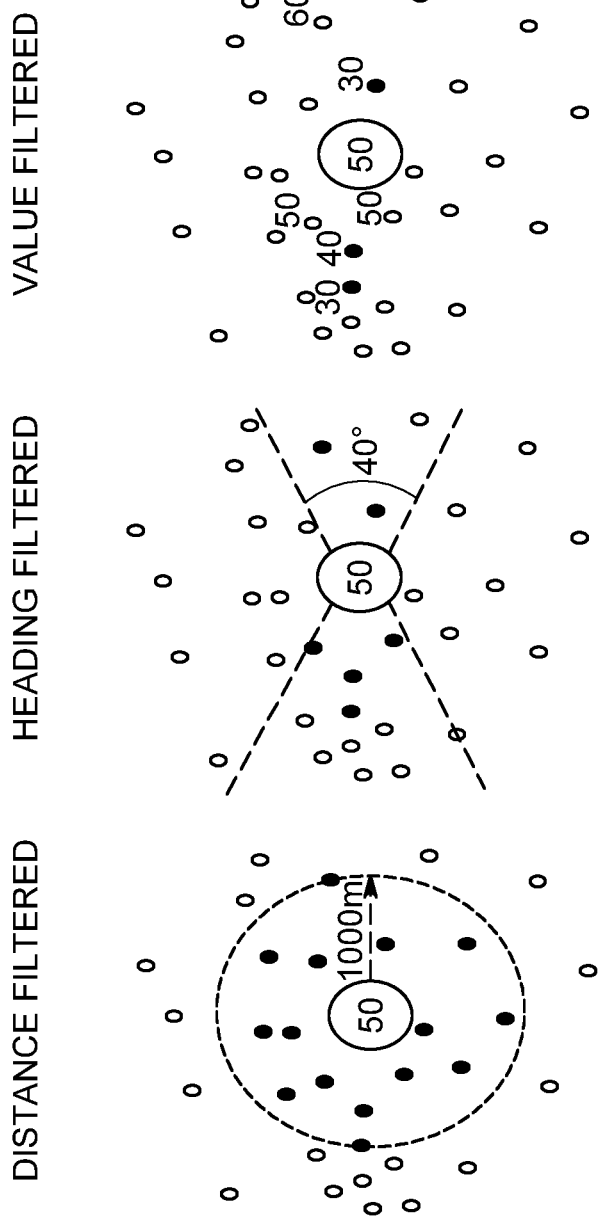

Having thus described example embodiments of the invention in general terms, reference will now be made to the accompanying drawings, which are not necessarily drawn to scale, and wherein:

FIG. 1 illustrates a schematic diagram of a system for generating at least one route speed funnel for roadwork zone identification, in accordance with an example embodiment;

FIG. 2 illustrates a block diagram of one embodiment of a system for generating at least one route speed funnel for roadwork zone identification, in accordance with an example embodiment;

FIG. 3 illustrates a block diagram of a mapping platform exemplarily illustrated in FIG. 2 that may be used to generate at least one route speed funnel for roadwork zone identification, in accordance with an example embodiment;

FIG. 4 illustrates a method for generating at least one route speed funnel for roadwork zone identification, in accordance with an example embodiment;

FIG. 5 illustrates a schematic diagram showing a speed funnel indicating a start of a roadwork zone, in accordance with an example embodiment;

FIG. 6 illustrates a schematic diagram comprising steps for determining a candidate speed funnel from a plurality of learned speed signs, in accordance with an example embodiment; and FIG. 7 illustrates a tabular representation showing determining a route speed funnel from a plurality of candidate speed funnels determined in FIG. 6.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "speed funnel" may be used to refer to a group of two or more speed signs indicating a change in sign values of speed signs from one end of the speed funnel to the other. A speed funnel may be used as an indication for a roadwork zone, an upcoming tunnel on a pathway, or a transition from a highway to a ramp.

The term "route speed funnel" may be used to refer to a speed funnel that indicates a roadwork zone on a route.

The term "route" may be used to refer to a path from a source location to a destination location on any link.

End of Definitions

A method, a system, and a computer program product are provided herein in accordance with an example embodiment for generating at least one route speed funnel for roadwork zone identification. Roadwork zones are temporarily defined by authorities to take up road repair work of a section of the road or an entire road. In such cases, the authorities may merge the two lanes of a road, or divert a lane to a by-lane, etc. Such road work repairs are intimated to travelers in advance of the actual commencement of the roadwork zone because such merging of the lanes may require reduction in speed of the vehicles to avoid collision or any mishap. Thus, at least one speed funnel may usually precede the roadwork zone. Vehicles may detect the speed funnels along a pathway in the vicinity of a roadwork as exemplarily illustrated in FIG. 5. In some embodiments, session identifiers may be associated with the vehicles that may capture road sign observations of road signs along the road. Speed funnels may also indicate an upcoming tunnel on a pathway, or a transition from a highway to a ramp. There is a need for a method and a system to filter out the speed funnels to obtain route speed funnels indicating only a roadwork zone on a route of a vehicle. Additionally, many route speed funnels may occur en route to a destination location indicating roadwork zones. In such scenarios, there is need for the method and the system to merge the route speed funnels with same starting location or same end location to obtain at least one final route speed funnel.

FIG. 1 illustrates a schematic diagram of a system 100 for generating at least one route speed funnel for roadwork zone identification, in accordance with an example embodiment. The system 100 includes a user equipment (UE) or a user device 101, which may be in communication with a mapping platform 105, over a network 103. The network 103 may be wired, wireless, or any combination of wired and wireless communication networks, such as cellular, Wi-Fi, internet, local area networks, or the like. The user equipment 101 may be a navigation system, that may be configured to provide route guidance and navigation related functions to the user of a vehicle. In some embodiments, the user equipment 101 may be installed in the vehicle and may capture road signs along pathways. The user equipment 101 may also include an image capturing device, such as a camera for capturing the road signs, for example speed signs. On capturing the road signs, the user equipment 101 generates road sign observations. The vehicle may also include one or more sensors for generating the road sign observations. The road signs may be static road signs or variable road signs positioned along the pathways. Sign values of variable road signs may vary based on traffic conditions in the vicinity of the variable road signs, such as, LCD display panels, LED panels, etc. The user equipment 101 or the sensors in the vehicle may transmit the generated road sign observations to an OEM cloud sequentially. In an embodiment, the road sign observations may be scheduled to be transmitted to the OEM cloud in batches.

The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a user interface of a mapping application, such that the user equipment 101 may provide navigational assistance to the user among other services provided through access to the mapping platform 105.

As exemplarily illustrated, the mapping platform 105 may also include a map database 107, which may store node data, road segment data or link data, point of interest (POI) data, posted signs related data or the like. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include data about the POIs and their respective locations in the POI records. The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the mapping platform 105. The map database 107 may additionally include data related to roadwork zones, such as, location of the roadwork zones, diversions to be caused due to the roadwork zones, suggested routes to avoid congestion to be caused due to the roadwork zones, etc. The data related roadwork zones may be fetched by the system 100 from external systems, such as, roadwork planning system of the municipalities.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 107 of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 101, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the map database 107 may be a master geographic database configured at a server side, but in alternate embodiments, a client-side map database 107 may represent a compiled navigation database that may be used in or with end user devices (e.g., user equipment 101) to provide navigation, speed adjustment and/or map-related functions to navigate through roadwork zones. The mapping platform 105 may cluster the road sign observations to generate learned speed signs that are map-matched on links of a map developed by the map developer. From the learned speed signs, the mapping platform 105 may generate candidate speed funnels as disclosed in the detailed description of FIG. 3. Furthermore, the mapping platform 105 may generate at least one route speed funnel indicating a roadwork zone from the candidate speed funnels. The map database 107 may be used with the end user device, that is, the user equipment 101 to provide the user with navigation features. In such a case, the map database 107 may be downloaded or stored on the user equipment 101 which may access the mapping platform 105 through a wireless or wired connection, over the network 103.

In one embodiment, the user device or the user equipment 101 may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, for example, and for determination of one or more personalized routes or route segments based on one or more calculated and recorded routes, according to some example embodiments. In some embodiments, the user of the vehicle may be notified by the mapping platform 105 about location of the roadwork zones and the user may use the user equipment 101, for example, the in-vehicle navigation system for navigation and map functions such as guidance and map display, according to some example embodiments. The user equipment 101 may include an application, for example, a mapping application with a user interface that may enable the user to access the mapping platform 105 for availing the functions disclosed above, such as, for navigating through identified roadwork zones on generating at least one route speed funnel.

FIG. 2 exemplarily illustrates a block diagram of one embodiment of a system 200 for generating at least one route speed funnel for roadwork zone identification for navigation of a vehicle 201 through a roadwork zone using a mapping platform 105. In some example embodiments, the system may implemented as a cloud based service that is accessible to vehicles such as the vehicle 201. Alternatively, the system may be implemented in conjunction with one or more components of the vehicle 201 or may be fully implemented within the vehicle 201 itself. The vehicle 201 may be a user driven vehicle or an autonomous vehicle. An autonomous vehicle, as used throughout this disclosure, may refer to a vehicle having autonomous driving capabilities at least in some conditions. The vehicle 201 may have a session identifier associated with it. A "session identifier" may refer to a vehicle identifier that may be a combination of letters and numbers. The system 200 includes a user equipment 101, including an application 203 with a user interface 205 for accessing one or more map and navigation related functions. The user equipment 101 may also include one or more sensors 207 such as a camera, an acceleration sensor, a gyroscopic sensor, a LIDAR sensor, a proximity sensor, a motion sensor and the like. The sensors 207 may primarily be used for detecting road signs and determining positioning of the vehicle 201 and the sensors 207 may be built-in or embedded into or within interior of the user equipment 101. In some embodiments, the user equipment 101 uses communication signals for position determination. The user equipment 101 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors 207 may be used to gather information related to an environment of the vehicle 201, such as, the roadwork zone. In some embodiments, the vehicle 201 may have sensors positioned on or within and the sensors may provide data indicating a location of the vehicle 201, heading data associated with road signs, sign types of the road signs, sign values of the road signs along pathways approaching a roadwork zone, and any other kinds of lane markings indicating a roadwork zone that is approaching. The data collected by the sensors may be transmitted to the OEM cloud with the associated session identifier. Each batch of the collected sensor data may have a corresponding session identifier. Vehicle data, also referred to herein as "probe data", may be collected by any device capable of determining the necessary information, and providing the necessary information to a remote entity. The user equipment 101 is one example of a device that may function as a probe to collect probe data of a vehicle 201.

More specifically, probe data collected by the user equipment 101 may be representative of the location of a vehicle 201 at a respective point in time and may be collected while a vehicle 201 is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment 101, may be any device capable of collecting the aforementioned probe data. In one example, using the sensor data from the user equipment 101, a mapping platform 105 similar to the mapping platform exemplarily illustrated in FIG. 1, may generate at least one route speed funnel for roadwork zone identification to assist the vehicle 201 to navigate through the roadwork zone. The sensor data generated by the sensors 207 may constitute road sign observations. That is, the sensors 207 installed in the vehicle or the user equipment may capture road signs along the pathway and capture the location of the road sign, type of the road sign, value of the road sign, heading at the location of the road sign, and time stamp associated with the time of capture of the road sign. The captured location of the road sign, type of the road sign, value of the road sign, heading at the location of the road sign, and time stamp associated with the capture of the road sign constitutes the road sign observations. Each road sign observation may be associated with a session identifier. The processing of the road sign observations to generate learned speed signs and processing of the learned speed signs to generate at least one route speed funnel is performed by the processor 303, exemplarily illustrated in FIG. 3, same as a processing component 109 exemplarily illustrated in FIG. 1, in the mapping platform 105 exemplarily illustrated in FIG. 3.

The system 200 may further include a services platform 209, which may be used to provide navigation related functions and services 211a-211i to the application 203 running on the user equipment 101. The services 211a-211i may include such as navigation functions, speed adjustment functions, traffic related updates, weather related updates, warnings and alerts, parking related services, indoor mapping services and the like. The services 211a-211i may be provided by a plurality of content providers 213a-213k. In some examples, the content providers 213a-213k may access various SDKs from the services platform 209 for implementing one or more services. In an example, the services platform 209 and the mapping platform 105 may be integrated into a single platform to provide a suite of mapping and navigation related applications for OEM devices, such as the user equipment 101. The user equipment 101 may be configured to interface with the services platform 209, the content provider's services 213a-213k, and the mapping platform 105 over a network 103. Thus, the mapping platform 105 and the services platform 209 may enable provision of cloud-based services for the user equipment 101, such as, storing the road sign observations in a OEM cloud in batches or in real-time and retrieving the stored road sign observations for generating at least one route speed funnel for roadwork zone identification, as disclosed in the detailed description of FIG. 3, by the vehicle 201 carrying the user equipment 101.

FIG. 3 illustrates a block diagram of a mapping platform 105 exemplarily illustrated in FIG. 2 that may be used to generate at least one route speed funnel for roadwork zone identification, in accordance with an example embodiment of the present invention. In the embodiments described herein, the mapping platform 105 comprises a data communication module 301, a learned sign generation module 305, a speed funnel filter 307, a route speed determination module 309, a funnel merger 311, and a user interface module 315. In this embodiment exemplarily illustrated in FIG. 3, the learned sign generation module 305, the speed funnel filter 307, the route speed determination module 309, and the funnel merger 311 are embodied within a processor 303. The processor 303 may retrieve computer program code instructions that may be stored in a memory 313 for execution of the computer program code instructions by the modules 305, 307, 309, and 311 of the mapping platform 105. The processor may control the execution of the computer program code instructions by the various modules (viz. 301, 305, 307, 309, 311, and 315) of the mapping platform 105. In one embodiment, the data communication module 301 communicates with the sensors 207 disclosed in the detailed description of FIG. 2 and may receive the sensor data and the road sign observations from the sensors 207. In an embodiment, the data communication module 301 may receive the road sign observations from the OEM cloud over the network 103. The road sign observations may refer to sensor data collected from cars as sensors, that is, sensors are installed in the car or in the user equipment. The sensor data may be generated on detection of static road signs positioned along the pathways. In some example embodiments, the sensor data may be from digital or dynamic signs, such as, LED panels, LCD panels, etc., positioned along the pathways. In some example embodiments, the data communication module 301 may also receive destination information of a user of the vehicle 201 via the network 103. The data communication module 301 may receive road sign observations associated with session identifiers. The road sign observations comprise time of capture of the road sign from vehicles such as, 201 as a time stamp associated with each of the road sign observations. A plurality of vehicles, such as, 201 passing by the location of each of the road signs on the pathway, generate a plurality of road sign observations for each of the road signs. Thus, each road sign observation is different from other road sign observation based on location data, heading data, road sign value, and road sign type, and time of capture of the road sign from a vehicle. The data communication module 301 may receive sensor data configured to describe a position of the user equipment 101 installed in the vehicle 201, or a controller of the user equipment 101 may receive the sensor data from the positioning system of the user equipment 101. The location of the road sign is the location of capture of the road sign from vehicles, such as, 201 and the location of the road sign constitutes the location data in a road sign observation.

Similarly, the heading associated with a road sign is the heading of the vehicle capturing the road sign and the heading of the road sign is the heading data in a road sign observation. The data inputted to the mapping platform 105, for example, the sensor data, etc., is transformed, processed, and executed upon by the mapping platform 105 to generate learned speed signs by the learned sign generation module 305 as disclosed below. The sensor data from the different sensors installed in the user equipment 101 or the vehicle 201 may be converted to units and ranges compatible with the mapping platform 105, to accurately generate learned speed signs that are map-matched.

In some example embodiments, the learned sign generation module 305 may generate a plurality of learned road signs from a plurality of road sign observations captured by the plurality of vehicles, such as, 201. The learned speed signs generated are associated with corresponding locations, corresponding headings, and corresponding sign values. The learned sign generation module 305 learns the road signs from the road sign observations and segregates learned speed signs from the learned road signs. The learned road signs may comprise different road signs, such as, speed limit signs, traffic signs, a gantry, etc., and the learned speed signs are the speed limit signs that are learnt. The learned sign generation module 305 map-matches the learned speed signs on links of a map. The learned speed sign "End of Speed limits and restrictions" is considered to have a sign value of 140 km/hr and the learned speed sign "Speed Limit start" is considered to have a sign value of 0 km/hr. The learned sign generation module 305 may cluster the road sign observations based on the location data, the heading data, the sign value, the sign type, and the map-matched link. The learned sign generation module 305 may use, DBSCAN algorithm on the location data to cluster the road sign observations and the minPts of the DBSCAN algorithm may be set to 3 and the eps of the DBSCAN algorithm may be set 15 meters. The minPts as a parameter depends on vehicle density and GPS accuracy and as such can be configured according to the scenario. In an embodiment, the learned sign generation module 305 may use, the DBSCAN algorithm on the heading data to cluster the road sign observations and the minPts of the DB SCAN algorithm may be set to 3 and the eps of the DB SCAN algorithm may be set 10 degrees. In an embodiment, the learned sign generation module 305 may cluster the road sign observations based on a lateral offset in each of the road sign observations and permanency of the road sign observations. In an embodiment, the learned sign generation module 305 may first, perform DBSCAN on the road sign observations and map-matches the generated clusters to the links. In an embodiment, the learned sign generation module 305 may use the learned road signs, such as, "SPEED_LIMIT_START" and "ALL_RESTRICTIONS_END" apart from the learned speed signs to segregate the learned speed signs occurring between the these learned road signs. That is, a start of a roadwork zone is typically indicated with the road sign "SPEED_LIMIT_START", an end of the roadwork zone is typically indicated with the road sign "ALL_RESTRICTIONS_END", and the speed limits signs are positioned between the start and the end of the roadwork zone. Each of the generated learned speed sign may constitute a candidate speed funnel. Each candidate speed funnel may include a different pair of learned speed signs from the generated learned speed signs. The candidate speed funnel may indicate an approaching roadwork zone or a leaving roadwork zone. That is, the candidate speed funnel with decreasing sign values of the learned speed signs indicates an approaching roadwork zone. The candidate speed funnel with increasing sign values of the learned speed signs indicates end of a roadwork zone, as the vehicle 201 may be accelerated after the roadwork zone is crossed.

The speed funnel filter 307 determines a plurality of candidate speed funnels from the plurality of the learned speed signs, based on the corresponding locations, the corresponding headings, and the corresponding sign values. For each learned speed sign, the speed funnel filter 307 calculates distances between the corresponding locations of each learned speed sign and the corresponding locations of the other generated learned speed signs. The speed funnel filter 307 may configure a threshold distance range, such as, 50 meters within which the calculated distances may lie. That is, for a speed funnel to indicate a roadwork zone, the speed limit signs are positioned at a distance of within 50 meters of each other. The speed funnel filter 307 filters the generated learned speed signs based on the threshold distance range and obtains a plurality of distance filtered learned speed signs as exemplarily illustrated in FIG. 6. For each of the distance filtered learned speed signs, the speed funnel filter 307 determines heading filtered speed signs with a heading difference between the heading of each of the distance filtered learned speed sign and the heading of the other distance learned speed signs lying within a threshold heading range, such as, 40 degrees as exemplarily illustrated in FIG. 6. The speed funnel filter 307 filters the heading filtered learned speed signs based on a difference in the sign values of each pair of the heading filtered learned speed signs within a threshold value range, such as, 30 km/hr and obtains a plurality of pairs of value filtered learned speed signs. That is, the speed limit signs indicating a roadwork zone may have a difference of 30 km/hr between them. In an embodiment, for each heading filtered learned speed sign, the speed funnel filter 307 may determine heading filtered learned speed signs with sign values less than the sign value of each heading filtered learned speed sign. In this embodiment, the speed funnel filter 307 may determine the heading filtered learned speed signs with sign values less than the sign value of each heading filtered learned speed sign by the threshold value range. Each pair of value filtered learned speed signs constitute a candidate speed funnel and the speed funnel filter 307 determines a plurality of candidate speed funnels. Each candidate speed funnel has a value filter learned speed sign with a higher sign value at a first position and another value filter learned speed sign at a second position in the candidate speed funnel with a lower sign value, compared to the sign value of the value filter learned speed sign at the first position as disclosed in the detailed description of FIG. 7.

The route speed funnel determination module 309 may generate at least one route speed funnel from the plurality of candidate speed funnels based on the session identifiers associated with a second plurality of vehicles of the vehicles, such as, 201 and corresponding time stamps of second plurality of road sign observations associated with the learned speed signs. The route speed funnel determination module 309 determines at least one route speed funnel that is on route towards destination of the user. For a candidate speed funnel to be one of the at least one route speed funnel, the value filtered learned speed signs may be generated by the speed funnel filter 307 from a second plurality of observations of the first plurality of observations and the second plurality of observations are captured from the second plurality of vehicles. That is, in a route speed funnel, the session identifiers associated with the value filtered learned speed signs are same and the time stamps corresponding to the road sign observations associated with the value filtered learned speed sign in the first position is earlier than the time stamps corresponding to the road sign observations associated with the value filtered learned speed sign in the second position. Furthermore, the candidate speed funnel to be a route speed funnel, a second plurality of vehicles, that is, at least 3 vehicles should have captured the same road sign observations corresponding to the value filtered learned speed signs as exemplarily illustrated in FIG. 7.

In embodiment, where at least two route speed funnels are determined by the route speed determination module 309 and if two or more route speed funnels of the at least two route speed funnels have a same value filtered learned speed sign at a first position or a second position in the route speed funnels, the funnel merger 311 may discard the route speed funnel with distance between the value filtered speed signs is larger. In an embodiment, where at least two route speed funnels are determined by the route speed determination module 309 and if a value filtered learned speed sign in a second position of the route speed funnel is same a value filtered learned speed sign in a first position of another route speed funnel, the funnel merger 311 may combine the two route speed funnels with a common value filtered learned speed sign to generate a final route speed funnel with three learned speed signs. In an embodiment, the maximum number of value filtered learned speed signs starting from a higher sign value to a lowest sign value in the final route speed funnel may be a 4. The location of the roadwork zone may be in vicinity of the location associated with the value filtered learned speed sign with the lowest sign value in the final route speed funnel. Based on the generated final route speed funnel, the user interface module 315 may output notifications regarding an approaching roadwork zone on the user interface 205. In an embodiment, the user interface module 315 may render indications of a roadwork zone ahead on the user interface 205. In an embodiment, the user interface module 315 may provide navigation suggestions to the user of the vehicle 201 to avoid the roadwork zone based on final route speed funnel generated by a plurality of vehicles plying on the pathway with the speed limit signs indicating the roadwork zone. The different representations of the navigation suggestions may be in the form of a map with color coded or patterned road links indicating traffic conditions on the route, locations of route speed funnels on the route, etc. In an embodiment, the user interface module 315 may receive destination information from the user on the user interface 205 of the user equipment 101. In some example embodiments, the user interface module 315 may notify the users of the vehicles 201 via the user interface 205 of the user equipment 101 about roadwork zone ahead based on the generated route speed funnel. In some example embodiments, the user interface module 315 renders the notification about changes in navigation routes due to the roadwork zone ahead and impact of the modified roadwork zones on parking situations, in mobile applications or navigation applications used by the users. The user interface module 315 may be configured to update the rendered recommendations on receiving control instructions from the processor 303.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or processors capable of processing large volumes of workloads and operations to provide support for big data analysis. In an example embodiment, the processor 303 may be in communication with a memory 313 via a bus for passing information among components of the system 200. The memory 313 may be non-transitory and may include, for example, one or more volatile and/or non-volatile memories. In other words, for example, the memory 313 may be an electronic storage device (for example, a computer readable storage medium) comprising gates configured to store data (for example, bits) that may be retrievable by a machine (for example, a computing device like the processor 303). The memory 313 may be configured to store information, data, content, applications, instructions, or the like, for enabling the apparatus to carry out various functions in accordance with an example embodiment of the present invention. For example, the memory 313 could be configured to buffer input data for processing by the processor 303. As exemplarily illustrated in FIG. 3, the memory 313 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 200 disclosed herein. The IoT related capabilities may in turn be used to provide smart city solutions by providing real time parking updates, big data analysis, and sensor based data collection by using the cloud based mapping platform 105 for providing navigation and parking recommendation services and roadwork zone identification services. In some embodiments, the mapping platform 105 may be configured to provide an environment for development of parking strategy recommendation solutions for navigation systems in accordance with the embodiments disclosed herein. The environment may be accessed using the user interface module 315 of the mapping platform 105 disclosed herein. The user interface module 315 may provide an interface for accessing various features and data stored in the mapping platform 105.

In some embodiments, the mapping platform 105 may be configured to provide a repository of algorithms for implementing a plurality of location based services for navigation systems. For example, the mapping platform 105 may include algorithms related to geocoding, routing (multimodal, intermodal, and unimodal), clustering algorithms, machine learning in location based solutions, natural language processing algorithms, artificial intelligence algorithms, and the like. The data for different modules of the mapping platform 105 may be collected using a plurality of technologies including but not limited to drones, sensors, connected cars, cameras, probes, chipsets and the like. The collected data may be processed by the processor 303 to generate at least one route speed funnel according to the embodiments disclosed herein. As noted above, the mapping platform 105 may be embodied by the processing component. However, in some embodiments, the mapping platform 105 may be embodied as a chip or chip set. In other words, the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform 105 may therefore, in some cases, be configured to implement an example embodiment of the present invention on a single "system on a chip." As such, in some cases, a chip or chipset may constitute a means for performing one or more operations for providing the functionalities described herein.

The user interface 205 of the user equipment 101 may in turn be in communication with the processor 303 to provide output to the user and, in some embodiments, to receive an indication of a user input. In some example embodiments, the system 200 may include a user interface 205 that communicates with the processor 303 and displays input and/or output of the mapping platform 105. As such, the user interface 205 may include a display and, in some embodiments, may also include a keyboard, a mouse, a joystick, a touch screen, touch areas, soft keys, one or more microphones, a plurality of speakers, or other input/output mechanisms. In one embodiment, the processor 303 may comprise user interface circuitry configured to control at least some functions of one or more user interface elements such as a display and, in some embodiments, a plurality of speakers, a ringer, one or more microphones and/or the like. The processor 303 and/or user interface circuitry comprising the processor 303 may be configured to control one or more functions of one or more user interface elements through computer program instructions (for example, software and/or firmware) stored on a memory accessible to the processor 303 (for example, memory device 310, and/or the like). In some example embodiments, the processor 303 may be configured to provide a method for generating at least one route speed funnel for road work zone identification as will be discussed in conjunction with FIG. 4 as below.

FIG. 4 exemplarily illustrates a method 400 for generating at least one route speed funnel for roadwork zone identification, in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 313 of the mapping platform 105, employing an embodiment of the present invention and executed by a processor 303 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 313 that may direct a computer or other programmable apparatus to function in a particular manner, such that the instructions stored in the computer-readable memory 313 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flow diagram of FIG. 4 for generating at least one route speed funnel for roadwork zone identification includes, at 401, generating a plurality of learned speed signs from a first plurality of road sign observations captured by a first plurality of vehicles. The first plurality of road sign observations comprise session identifiers associated with the first plurality of vehicles and the plurality of learned speed signs are associated with corresponding locations, corresponding headings, and corresponding sign values. At 403, the method 400 may include determining a plurality of candidate speed funnels from the plurality of learned speed signs, based on the corresponding locations, the corresponding headings, and/or the corresponding sign values. Each of the plurality of candidate speed funnels comprises a different pair of learned speed signs selected from the plurality of learned speed signs. At 405, the method 400 may include generating at least one route speed funnel from the plurality of candidate speed funnels based on the session identifiers associated with a second plurality of vehicles of the first plurality of vehicles and the corresponding time stamps of second plurality of road sign observations associated with the plurality of learned speed signs as disclosed in the detailed description of FIG. 3.

In an example embodiment, a system for performing the method of FIG. 4 above may comprise a processor (e.g. the processor 303) configured to perform some or each of the operations (401-405) described above. The processor may, for example, be configured to perform the operations (401-405) by performing hardware implemented logical functions, executing stored instructions, or executing algorithms for performing each of the operations. Alternatively, the system may comprise means for performing each of the operations described above. In this regard, according to an example embodiment, examples of means for performing operations 401-405 may comprise, for example, the processor 303 and/or a device or circuit for executing instructions or executing an algorithm for processing information as described above.

On implementing the method 400 disclosed herein, the end result generated by the mapping platform 105 is a tangible determination of at least one route speed funnel for roadwork zone identification. Roadwork zones are preceded by speed funnels, lane markings, traffic cones, etc. Route speed funnels usually start from a distance from the roadwork zone to decelerate vehicles plying on the pathway towards the roadwork zone. The determination of the roadwork zone at the downstream of the route speed funnel by the mapping platform 105 aids the autonomous vehicles in transitioning from an autonomous mode to a manual mode smoothly. In a roadwork zone, operating the autonomous vehicle in the manual mode is preferred to avoid any undue mishaps or collisions from taking place. The mapping platform 105 is capable of determining the route speed funnel identifying the roadwork zones on highways, local roads, etc.

Example embodiments disclosed herein provides an improvement in navigation technology related to roadwork zone identification as follows: The roadwork zone may have numerous people working with heavy machinery. The roadwork zone may lead to a blockage on the road and may result in diversions or merging of the lanes of the road. A prior intimation of an approaching roadwork zone may avoid any accident from taking place at the roadwork zones due to plying vehicles and also saves travel time of users plying via the roadwork zone. An approaching roadwork zone may require a decrease in speed of the vehicles prior to the roadwork zone and in the roadwork zone. The decrease in speed of the vehicles may allow authorities to plan and manage movement of the heavy machinery at the roadwork zone to avoid mishaps. The mapping platform 105 uses road sign observations generated from the vehicles plying via a roadwork zone and may generate learned speed signs. The learned speed signs are map-matched to a link similar to the speed limit signs on a pathway prior to the roadwork zone. The mapping platform 105 collects sensor data as disclosed in FIG. 2 from the vehicles on a day, obtains the road sign observations from the collected sensor data, and clusters the road sign observations based on location, heading, sign type, and sign value of the road signs on the same day. The collected sensor data may be stored in an OEM cloud and the mapping platform 105 may access the OEM cloud for clustering the road sign observations and storing the clusters in the OEM cloud again. On clustering, the mapping platform 105 removes outliers from them to result in only few learned speed signs. Thus embodiments of the present invention result in lesser processing thereby leading to low resource utilization for solving a problem deeply rooted in navigation technology, autonomous vehicles, and vehicular safety. The mapping platform 105 extracts only learned speed signs from learned road signs corresponding to other road sign observations. The mapping platform 105 may further filter out the learned speed signs to obtain value filtered learned speed signs that may constitute a plurality of candidate speed funnels as disclosed in the detailed description of FIG. 3. Determining the candidate speed funnels is a time intensive and a processor intensive step which the mapping platform 105 is capable of performing accurately. From the determined candidate speed funnels, the mapping platform 105 determines at least one route speed funnel identifying a roadwork zone. If more than one route speed funnels are generated, there may be a likelihood of the route speed funnels sharing a common learned speed sign. In such cases to avoid duplication of common learned speed signs, the mapping platform 105 may efficiently merge the route speed funnels with common learned speed signs to generate a final route speed funnel. The final route speed funnel may aid in identifying a roadwork zone ahead. Such final route speed funnels may be stored in the map database 107 to aid in navigation of the vehicles through the roadwork zone until the road takes place. The final route speed funnels stored in the map database 107 may constitute historic data for the authorities to plan roadwork in the future. In an embodiment, the route speed funnel may be one of the inputs apart from lane markings and traffic cones to a system to identify the roadwork zones ahead. The mapping platform 105, in an embodiment, may generate recommendations on navigation routes or different modes of transport preferable to avoid the roadwork zone based on the detected route speed funnel.

FIG. 5 illustrates a schematic diagram showing a speed funnel indicating a start of a roadwork zone, in accordance with an example embodiment. As exemplarily illustrated, a vehicle traveling towards a roadwork zone may be warned about an approaching roadwork zone by a plurality of road signs, such as, a "men at work" sign, speed limit signs, road work announcements, etc. In an embodiment, the speed limit signs succeeding the "men at work" sign resemble a speed funnel. Currently, owing to limitations pertaining to sensor capabilities and image processing capabilities, it may be difficult to detect the "men at work" sign and as such the autonomous vehicle may not interpret the warning signage. To this end, embodiments of the present disclosure are directed towards discerning the warning from speed limit signs. Accordingly, the sensors may capture one or more road sign observations corresponding to the speed limit signs. The mapping platform 105, based on the road sign observations, generates learned speed signs as disclosed in the detailed description of FIG. 3. Using the learned speed signs, the mapping platform 105 determines candidate speed funnels based on the location, heading, and sign value of the learned speed signs. The mapping platform 105 may further determine a route speed funnel comprises the learned speed signs corresponding to the speed limit signs 90, 70, 50, and 30, in the same order as the value filtered learned speed signs as disclosed in the detailed description of FIG. 7. As exemplarily illustrated, the sign values of the value filtered learned speed signs decreases from a highest value 90 km/hr to 30 km/hr. The roadwork zone may be searched in the vicinity of the value filtered learned speed sign 30. In case of autonomous vehicles, on detecting the route speed funnel (90 70, 50, 30), the autonomous vehicle may shift from the autonomous mode to the manual mode to navigate through the roadwork zone carefully.

FIG. 6 illustrates a schematic diagram comprising steps for determining a candidate speed funnel from a plurality of learned speed signs, in accordance with an example embodiment. As exemplarily illustrated, consider the learned speed sign 50 is a target learned speed sign that is part of a candidate speed funnel and the learned speed sign 50 has a sign value of 50 km/hr, heading of 90 degrees, and is a sign type indicating a speed limit start. For one of the learned speed signs to constitute the candidate speed funnel along with the learned speed sign 50, the mapping platform 105 filters the learned speed signs to determine qualified learned speed signs in each step. The mapping platform 105 determines distance between the learned speed sign 50 and the other learned speed signs and the mapping platform 105 determines the qualified learned speed signs within a distance threshold range, for example, 1000 meters from the target learned speed sign 50. The learned speed signs lying within a radius of 1000 m from the target learned speed sign 50 are determined to be qualified learned speed signs or distance filtered learned speed signs by the mapping platform 105. The mapping platform 105, further, determines qualified learned speed signs or heading filtered learned speed signs from the distance filtered learned speed signs with a heading difference of 40 degrees with the heading of the target learned speed sign 50. The mapping platform 105 may further determine qualified learned speed signs or value filtered learned speed signs from the heading filtered learned speed signs with sign value less than 50 and within a sign value difference of 30 km/hr from the target learned speed sign 50. The mapping platform 105 determines the qualified learned speed signs or value filtered learned speed signs with sign values, 40 km/hr and 30 km/hr. Thus, the candidate speed funnels are (50, 40), and (50, 30).

FIG. 7 illustrates a tabular representation showing determining a route speed funnel from a plurality of candidate speed funnels determined in FIG. 6. As disclosed in the detailed description of FIG. 3, the mapping platform 105 may determine a route speed funnel from the candidate speed funnels, where the value filtered learned speed signs of the route speed funnel are generated from a second plurality of road sign observations obtained from a second plurality of vehicles. Similarly, a route speed funnel is determined from the candidate speed funnels (50, 40) and (50, 30) based on number of observations associated with the value filtered learned speed signs in each candidate speed funnel. As exemplarily illustrated, the session identifiers of associated with the vehicles are 1, 2, 3, 4, . . . , 9, and 10. Consider the mapping platform 105 is determining whether the candidate funnel (50, 40) is a route speed funnel. The target learned speed sign 50 is observed by the vehicles with session identifier 1, 9, 3, 4, 2, 7, and 5 and the value filtered learned speed sign 40 is observed by the vehicles with session identifiers 4, 2, 7, and 10 as shown. The vehicle with session identifier 1 observed the target learned speed sign 50 but did not observe the value filtered learned speed sign 40. However, the vehicle with session identifier 4 observed the target learned speed sign 50 and also observed the value filtered learned speed sign 40. Similarly, the vehicle with session identifier 2 observed the target learned speed sign 50 and also observed the value filtered learned speed sign 40. Similarly, the vehicle with session identifier 7 observed the target learned speed sign 50 and also observed the value filtered learned speed sign 40. Since 3 vehicles had observed the target learned speed sign 50 and the value filtered learned speed sign 40, the mapping platform 105 determines the candidate funnel (50, 40) to be a route speed funnel. Similarly, the mapping platform 105 may determine the candidate funnel (50, 30) also to be a route speed funnel. Now the route speed funnels (50, 40) and (50, 30) have a common learned speed sign 50 at a first position. The mapping platform 105 may eliminate the route speed funnel (50, 40) and retain the route speed funnel (50, 30) on comparing the distance between the value filtered learned speed signs in the route speed funnels and considering the route speed funnel with (50, 30) with smaller distance between the value filtered learned speed signs 50 and 30. Similarly, consider the mapping platform 105 determines the route speed funnels (90, 70) and (70, 50) as disclosed in FIG. 6 and FIG. 7. The mapping platform 105 determines that a common learned speed sign is present between each pair of route speed funnels. That is, between the route speed funnel (90, 70) and route speed funnel (70, 50), the value filtered learned speed sign 70 is common. The mapping platform 105 merges the route speed funnels (90, 70) and (70, 50) to form a route speed funnel (90, 70, 50). Similarly between the route speed funnel (90, 70, 50) and route speed funnel (50, 30), the value filtered learned speed sign 50 is common. The mapping platform 105 merges the route speed funnels as disclosed in the detailed description of FIG. 3 to obtain a final route speed funnel (90, 70, 50, 30) as exemplarily illustrated in FIG. 5. The generate route speed funnel indicates a roadwork zone in the downstream of the value filtered learned speed sign 30.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for generating at least one route speed funnel for roadwork zone identification, the method comprising:
   generating, by a processor, a plurality of learned speed signs from a first plurality of road sign observations captured by a plurality of image capturing devices on a first plurality of vehicles,
      wherein the first plurality of road sign observations comprise session identifiers associated with the first plurality of vehicles, and
      wherein the plurality of learned speed signs are associated with corresponding locations, corresponding headings, and corresponding sign values;
   determining a plurality of candidate speed funnels from the plurality of learned speed signs, based on the corresponding locations, the corresponding headings, and the corresponding sign values, wherein each of the plurality of candidate speed funnels comprises a different pair of learned speed signs selected from the plurality of learned speed signs; and
   generating the at least one route speed funnel from the plurality of candidate speed funnels based on the session identifiers associated with a second plurality of vehicles of the first plurality of vehicles and corresponding time stamps of a second plurality of road sign observations associated with the plurality of learned speed signs; and
   enabling a mode transition from an autonomous mode to a manual mode in a vehicle prior to the roadwork zone based on the generated at least one route speed funnel.

2. The method of claim 1, wherein the first plurality of road sign observations further comprise location data, heading data, road sign types, road sign values, and time stamps associated with capture of the first plurality of road sign observations.

3. The method of claim 1, wherein the determining of the plurality of candidate speed funnels comprises:
   calculating a plurality of distances between the corresponding locations of learned speed signs of each pair of learned speed signs in the generated plurality of learned speed signs;
   filtering the generated plurality of learned speed signs based on the calculated plurality of distances lying within a threshold distance range, to obtain a plurality of distance filtered learned speed signs;
   determining a plurality of heading filtered learned speed signs from the plurality of distance filtered learned speed signs based on a heading difference between each pair of the plurality of distance filtered learned speed signs lying within a threshold heading range;
   filtering the plurality of heading filtered learned speed signs based on a difference in the corresponding sign values of each pair of the plurality of heading filtered learned speed signs lying within a threshold value range, to obtain a plurality of pairs of value filtered learned speed signs; and
   determining the plurality of candidate speed funnels based on the plurality of pairs of value filtered learned speed signs.

4. The method of claim 1,
   wherein the at least one route speed funnel comprises a different pair of learned speed signs generated from the second plurality of road sign observations of the first plurality of road sign observations,
   wherein the second plurality of road sign observations are captured by the second plurality of vehicles,
   wherein a sign value of a learned speed sign in a first position in the at least one route speed funnel is greater than a sign value of a learned speed sign in a second position in the at least one route speed funnel, and
   wherein the second plurality of the road sign observations corresponding to the learned speed sign in the first position have corresponding time stamps earlier than corresponding time stamps of the second plurality of the road sign observations corresponding to the learned speed sign in the second position in the at least one route speed funnel.

5. The method of claim 4, further comprising determining presence of a roadwork zone in vicinity of a corresponding location of the learned speed sign in the second position in the at least one route speed funnel.

6. The method of claim 1,
   wherein the generated at least one route speed funnel comprises two or more route speed funnels, and
   wherein at least two route speed funnels of the two or more route speed funnels have a common learned speed sign.

7. The method of claim 6, further comprising merging the at least two route speed funnels of the two or more route speed funnels based on a position of the common learned speed sign in each of the at least two route speed funnels of the two or more route speed funnels.

8. A system for generating at least one route speed funnel for roadwork zone identification, the system comprising:
   at least one non-transitory memory configured to store computer program code instructions; and
   at least one processor configured to execute the computer program code instructions to:
      generate, a plurality of learned speed signs from a first plurality of road sign observations captured by a plurality of image capturing devices on a first plurality of vehicles, wherein the first plurality of road sign observations comprise session identifiers associated with the first plurality of vehicles, and wherein the plurality of learned speed signs are associated with corresponding locations, corresponding headings, and corresponding sign values;

determine a plurality of candidate speed funnels from the plurality of learned speed signs, based on the corresponding locations, the corresponding headings, and the corresponding sign values, wherein each of the plurality of candidate speed funnels comprises a different pair of learned speed signs selected from the plurality of learned speed signs;

generate the at least one route speed funnel from the determined plurality of candidate speed funnels based on the session identifiers associated with a second plurality of vehicles of the first plurality of vehicles and corresponding time stamps of a second plurality of road sign observations associated with the plurality of learned speed signs; and enabling a mode transition from an autonomous mode to a manual mode in a vehicle prior to the roadwork zone based on the generated at least one route speed funnel.

9. The system of claim 8, wherein the first plurality of road sign observations further comprise location data, heading data, road sign types, road sign values, and time stamps associated with capture of the first plurality of road sign observations.

10. The system of claim 8, wherein the at least one processor is further configured to:

calculate a plurality of distances between the corresponding locations of learned speed signs of each pair of learned speed signs in the generated plurality of learned speed signs;

filter the generated plurality of learned speed signs based on the calculated plurality of distances lying within a threshold distance range, to obtain a plurality of distance filtered learned speed signs;

determine a plurality of heading filtered learned speed signs from the plurality of distance filtered learned speed signs based on a heading difference between each pair of the plurality of distance filtered learned speed signs lying within a threshold heading range;

filter the plurality of heading filtered learned speed signs based on a difference in the corresponding sign values of each pair of the plurality of heading filtered learned speed signs lying within a threshold value range, to obtain a plurality of pairs of value filtered learned speed signs; and determine the plurality of candidate speed funnels based on the plurality of pairs of value filtered learned speed signs.

11. The system of claim 8, wherein the at least one route speed funnel comprises a different pair of learned speed signs generated from the second plurality of road sign observations of the first plurality of road sign observations, wherein the second plurality of road sign observations are captured by the second plurality of vehicles, wherein a sign value of a learned speed sign in a first position in the at least one route speed funnel is greater than a sign value of a learned speed sign in a second position in the at least one route speed funnel, and wherein the second plurality of the road sign observations corresponding to the learned speed sign in the first position have corresponding time stamps earlier than corresponding time stamps of the second plurality of the road sign observations corresponding to the learned speed sign in the second position in the at least one route speed funnel.

12. The system of claim 11, wherein the at least one processor is further configured to determine presence of a roadwork zone in vicinity of a corresponding location of the learned speed sign in the second position in the at least one route speed funnel.

13. The system of claim 8, wherein the generated at least one route speed funnel comprises two or more route speed funnels, and wherein at least two route speed funnels of the two or more route speed funnels have a common learned speed sign.

14. The system of claim 13, wherein the at least one processor is further configured to merge the at least two route speed funnels of the two or more route speed funnels based on a position of the common learned speed sign in each of the at least two route speed funnels of the two or more route speed funnels.

15. A computer program product comprising at least one non-transitory computer-readable storage medium having stored thereon computer-executable program code instructions which when executed by a computer, cause the computer to carry out operations for generating at least one route speed funnel for roadwork zone identification, the operations comprising:

generating, by a processor, a plurality of learned speed signs from a first plurality of road sign observations captured by a plurality of image capturing devices on a first plurality of vehicles, wherein the first plurality of road sign observations comprise session identifiers associated with the first plurality of vehicles, and wherein the plurality of learned speed signs are associated with corresponding locations, corresponding headings, and corresponding sign values;

determining a plurality of candidate speed funnels from the plurality of learned speed signs, based on the corresponding locations, the corresponding headings, and the corresponding sign values, wherein each of the plurality of candidate speed funnels comprises a different pair of learned speed signs selected from the plurality of learned speed signs;

generating the at least one route speed funnel from the determined plurality of candidate speed funnels based on the session identifiers associated with a second plurality of vehicles of the first plurality of vehicles and corresponding time stamps of a second plurality of road sign observations associated with the plurality of learned speed signs; and enabling a mode transition from an autonomous mode to a manual mode in a vehicle prior to the roadwork zone based on the generated at least one route speed funnel enabling a driving function or alert prior to the roadwork zone based on the generated at least one route speed funnel.

16. The computer program product of claim 15, wherein the operations further comprise:

calculating a plurality of distances between the corresponding locations of learned speed signs of each pair of learned speed signs in the generated plurality of learned speed signs;

filtering the generated plurality of learned speed signs based on the calculated plurality of distances lying within a threshold distance range, to obtain a plurality of distance filtered learned speed signs;

determining a plurality of heading filtered learned speed signs from the plurality of distance filtered learned speed signs based on a heading difference between each pair of the plurality of distance filtered learned speed signs lying within a threshold heading range;

filtering the plurality of heading filtered learned speed signs based on a difference in the corresponding sign values of each pair of the plurality of heading filtered learned speed signs lying within a threshold value range, to obtain a plurality of pairs of value filtered learned speed signs; and determining the plurality of candidate speed funnels based on the plurality of pairs of value filtered learned speed signs.

17. The computer program product of claim 15,
wherein the at least one route speed funnel comprises a different pair of learned speed signs generated from the second plurality of road sign observations of the first plurality of road sign observations,
wherein the second plurality of road sign observations are captured by the second plurality of vehicles,
wherein a sign value of a learned speed sign in a first position in the at least one route speed funnel is greater than a sign value of a learned speed sign in a second position in the at least one route speed funnel, and
wherein the second plurality of the road sign observations corresponding to the learned speed sign in the first position have corresponding time stamps earlier than corresponding time stamps of the second plurality of the road sign observations corresponding to the learned speed sign in the second position in the at least one route speed funnel.

18. The computer program product of claim 17, wherein the operations further comprise determining a roadwork zone in vicinity of a corresponding location of the learned speed sign in the second position in the at least one route speed funnel.

19. The computer program product of claim 15,
wherein the generated at least one route speed funnel comprises two or more route speed funnels, and
wherein at least two route speed funnels of the two or more route speed funnels have a common learned speed sign.

20. The computer program product of claim 19, wherein the operations further comprise merging the at least two route speed funnels of the two or more route speed funnels based on a position of the common learned speed sign in each of the at least two route speed funnels of the two or more route speed funnels.

* * * * *